US010401475B2

(12) United States Patent
Villeval et al.

(10) Patent No.: US 10,401,475 B2
(45) Date of Patent: Sep. 3, 2019

(54) MULTIPLE MODULATION ELEMENT RADAR WAVEFORM GENERATION

(71) Applicant: GM Global Technology Operations LLC, Detroit, MI (US)

(72) Inventors: Shahar Villeval, Tel Aviv (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 343 days.

(21) Appl. No.: 15/370,309

(22) Filed: Dec. 6, 2016

(65) Prior Publication Data

US 2018/0156892 A1 Jun. 7, 2018

(51) Int. Cl.
*G01S 7/35* (2006.01)
*G01S 13/93* (2006.01)
*G01S 13/00* (2006.01)
*G01S 13/34* (2006.01)

(52) U.S. Cl.
CPC .............. *G01S 7/35* (2013.01); *G01S 13/003* (2013.01); *G01S 13/345* (2013.01); *G01S 13/931* (2013.01)

(58) Field of Classification Search
CPC ... G01S 7/03; G01S 7/282; G01S 7/35; G01S 13/003; G01S 13/34; G01S 13/343; G01S 13/345; G01S 13/931
See application file for complete search history.

(56) References Cited

U.S. PATENT DOCUMENTS

| 4,347,513 A * | 8/1982 | Schindler | G01S 7/003 342/13 |
| 6,067,040 A * | 5/2000 | Puglia | G01S 13/103 342/134 |
| 8,847,814 B2 * | 9/2014 | Himmelstoss | G01S 7/03 342/175 |
| 8,958,408 B1 * | 2/2015 | Jain | H04B 7/0678 342/368 |
| 2003/0164791 A1 * | 9/2003 | Shinoda | G01S 13/4463 342/70 |
| 2005/0156779 A1 * | 7/2005 | Wixforth | G01S 7/288 342/70 |
| 2007/0176822 A1 * | 8/2007 | Shirakawa | G01S 13/003 342/28 |
| 2008/0049709 A1 * | 2/2008 | Pan | H04B 7/0634 370/344 |
| 2008/0225375 A1 * | 9/2008 | Newberg | G02B 6/122 359/279 |
| 2009/0303126 A1 * | 12/2009 | Jain | G01S 13/003 342/368 |
| 2011/0013716 A1 * | 1/2011 | Brodzik | G01S 13/003 375/295 |
| 2011/0057831 A1 * | 3/2011 | Shinomiya | G01S 3/74 342/74 |

(Continued)

*Primary Examiner* — Peter M Bythrow
(74) *Attorney, Agent, or Firm* — Cantor Colburn LLP

(57) ABSTRACT

A radar system and method of configuring a radar system that includes two or more antennas to transmit a respective transmit waveform. Two or more waveform generation devices include respective modulation elements. Each of the two or more waveform generation devices has a one-to-one correspondence with one of the two or more antennas, and each of the two or more waveform generation devices generates the respective transmit waveform for a first period of time and generates an arbitrary response for a second period of time.

10 Claims, 4 Drawing Sheets

(56) References Cited

U.S. PATENT DOCUMENTS

| | | | |
|---|---|---|---|
| 2011/0215964 A1* | 9/2011 | Shirakawa | G01S 13/003 342/25 R |
| 2012/0146846 A1* | 6/2012 | Antonik | G01S 7/282 342/25 B |
| 2013/0321198 A1* | 12/2013 | Park | G01S 13/02 342/175 |
| 2014/0208845 A1* | 7/2014 | Zlotnick | G01F 22/00 73/290 V |
| 2015/0168546 A1* | 6/2015 | Nakagawa | G01S 7/282 342/21 |
| 2015/0212198 A1* | 7/2015 | Nishio | G01S 7/415 342/385 |
| 2016/0178730 A1* | 6/2016 | Trotta | G01S 7/006 342/175 |
| 2016/0334511 A1* | 11/2016 | Ling | G01S 13/0209 |
| 2017/0212217 A1* | 7/2017 | Bergin | G01S 13/0209 |
| 2017/0276770 A1* | 9/2017 | Lin | G01S 7/4004 |
| 2017/0307744 A1* | 10/2017 | Loesch | G01S 7/03 |
| 2017/0343648 A1* | 11/2017 | Trotta | G01S 7/35 |
| 2018/0074173 A1* | 3/2018 | Trotta | G01S 13/343 |
| 2018/0088224 A1* | 3/2018 | Kishigami | H01Q 21/08 |
| 2018/0348340 A1* | 12/2018 | Lien | G01S 7/2813 |

\* cited by examiner

MULTIPLE MODULATION ELEMENT RADAR WAVEFORM GENERATION

INTRODUCTION

The subject invention relates to multiple modulation element radar waveform generation.

Radar systems are widely used for target detection and monitoring. In an exemplary automobile application, for example, a radar system, along with other sensors, can be used to detect and avoid obstacles. The radar output contributes to collision avoidance and automated steering among other objectives. A multi-input multi-output (MIMO) radar system transmits energy from a number of transmitter antenna elements and receives resulting reflections at a number of receiver antenna elements. In order to easily resolve the reflections resulting from the different transmitter elements, each transmitter element may transmit a different waveform and may additionally or alternately transmit at a different time according to a time division multiple access (TDMA) scheme. The waveform shape can be controlled using a modulated voltage source, but voltage relaxation periods are needed between transmissions to avoid transmission of an unintended arbitrary waveform. The maximal detected velocity of the radar system increases as transmission rate increases. Thus, when the relaxation periods delay subsequent transmissions, the reduced transmission rate decreases the maximal detected velocity. Accordingly, it is desirable to provide a radar system that does not require a reduced transmission rate to account for voltage relaxation periods when using a modulated voltage source.

SUMMARY

In one exemplary embodiment of the invention, a radar system includes two or more antennas to transmit a respective transmit waveform, and two or more waveform generation devices including respective modulation elements. Each of the two or more waveform generation devices has a one-to-one correspondence with one of the two or more antennas, and each of the two or more waveform generation devices generates the respective transmit waveform for a first period of time and generates an arbitrary response for a second period of time.

In another exemplary embodiment, a method of configuring a radar system includes arranging two or more antennas to transmit a respective transmit waveform; and coupling two or more waveform generation devices including respective modulation elements to the two or more antennas, wherein each of the two or more waveform generation devices has a one-to-one correspondence with one of the two or more antennas and each of the two or more waveform generation devices is configured to generate the respective transmit waveform for a first period of time and generate an arbitrary response for a second period of time.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
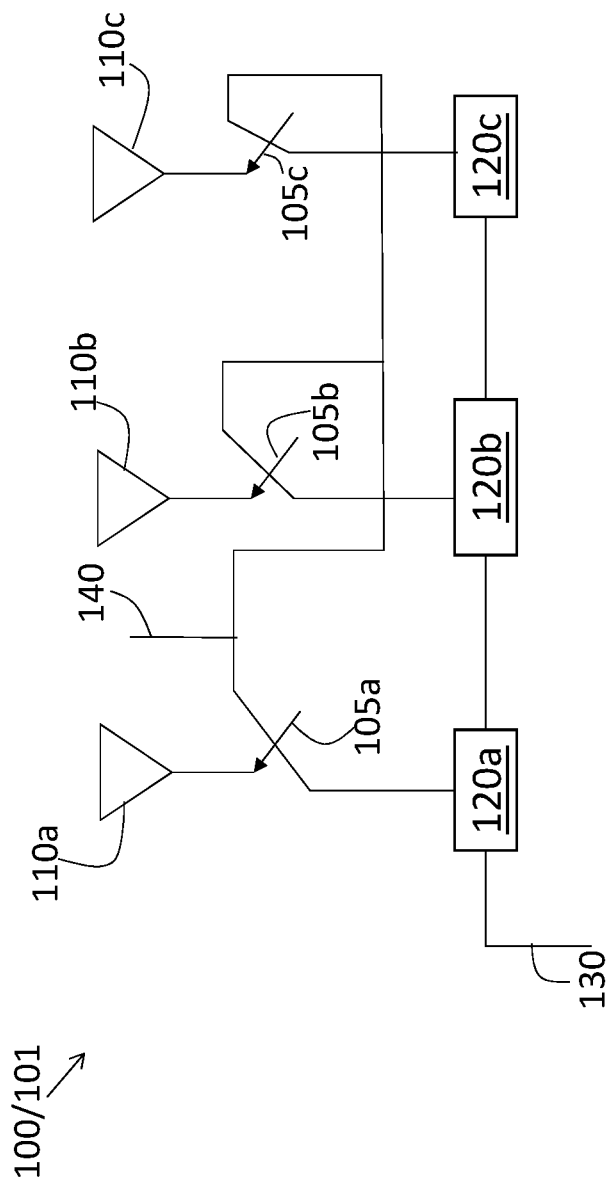
FIG. 1 is a block diagram of components of a transmit portion of a radar system according to one or more embodiments.

The following description is merely exemplary in nature and is not intended to limit the present disclosure, its application or uses. It should be understood that throughout the drawings, corresponding reference numerals indicate like or corresponding parts and features.

Radar systems that are used for automotive and other applications can have multiple receiver elements, in a MIMO configuration, or multiple transmitter elements and one receiver element. In either case, transmitting with each of the transmitter elements in turn delays the time at which each transmitter element can transmit again. As previously noted, the maximum resolvable target velocity by a radar system increases as the repetition rate of transmissions increases. Thus, a higher number of transmitter elements decreases the maximal resolvable target velocity of the system. On the other hand, a higher number of transmitter elements increases the angular resolution of target position. Accordingly, the number of transmitter elements is selected to balance desired maximal target velocity and desired angular resolution. For a given number of transmitter elements, a voltage relaxation period is required when a modulated voltage source is used to shape the waveform that is transmitted. In prior systems, the same modulation element is used for each transmitter element. As a result, the voltage relaxation period is an additional delay between transmissions by each transmitter element. This additional delay increases the time between transmissions by the same transmitter element (i.e., the delay reduces the transmission rate) and, thereby, reduces the maximal resolvable velocity. According to the methods and systems detailed herein, the reduction in transmission rate due to the voltage relaxation period is eliminated by configuring each transmitter element to have a different modulation element.

Figure 2:
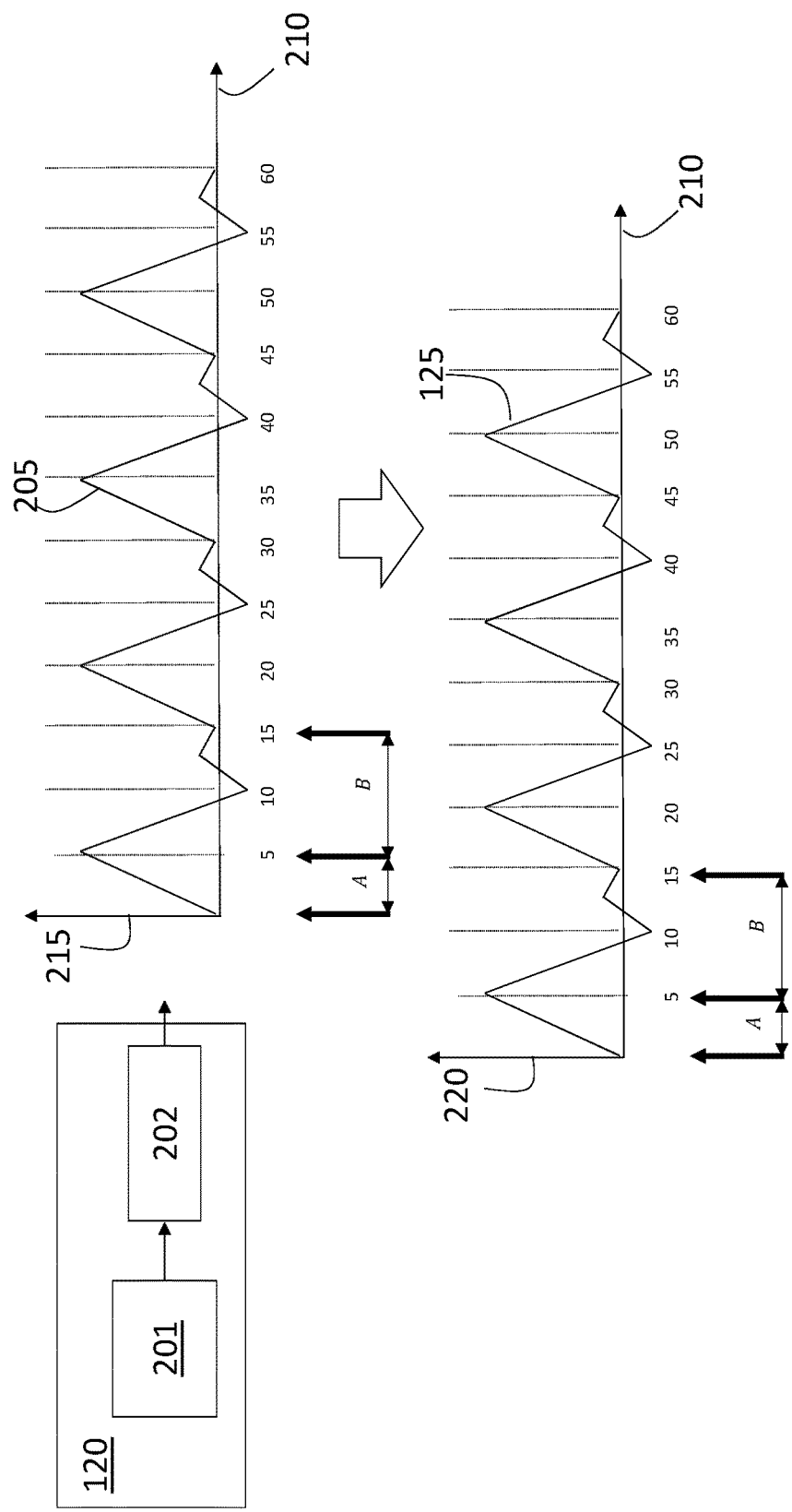
FIG. 2 shows a block diagram of relevant components of a waveform generation device and resulting voltage and frequency waveforms for a radar system according to one or more embodiments.

In accordance with an exemplary embodiment of the invention, FIG. 1 is a block diagram of components of a transmit portion 100 of a radar system 101. The exemplary transmitter 100 includes three transmit antennas 110a, 110b, 110c (generally, 110) but any number of antennas 110 may be included. According to one embodiment, the same antennas 110 may be used for both transmit and receive functions in a transceiver configuration. Each antenna 110a, 110b, 110c is supplied with a transmit waveform by a corresponding waveform generation device 120a, 120b, 120c (generally, 120) that includes a modulation element 201 (FIG. 2). Each modulation element 201 can be, for example, a phase locked loop (PLL) or its digital counterpart, a direct digital synthesizer (DDS). These devices are well-known frequency stabilization devices and are, therefore, only discussed with reference to FIG. 2 in terms of the relevant functionality. The waveform generation device 120 is supplied with a clock signal 130.

Each antenna 110a, 110b, 110c is associated with a respective switch 105a, 105b, 105c (generally 105) that switches the antenna 110 on or off. A control line 140 carries a control signal to control the switches 105. According to embodiments detailed herein, each antenna 110 is switched on during the controlled voltage period and switched off during the relaxation period and during transmission by other antennas 110. Because each antenna 110 has a separate modulation element 120, one antenna 110 can transmit during the relaxation period associated with another antenna 110. As such, the relaxation period does not represent a separate and additional delay between repeated transmissions by a given antenna 110.

FIG. 2 shows a block diagram of relevant components of a waveform generation device 120 and resulting voltage and frequency waveforms for a radar system 101 according to one or more embodiments. Each waveform generation device 120 includes a modulation element 201 (e.g., PLL, DDS), which acts as a frequency stabilization device, and voltage controlled oscillator (VCO) 202. Other known components of the waveform generation device 120 are not shown or detailed. The modulation element 201 stabilizes and modulates a frequency signal that is fed to the VCO 202. The VCO 202 turns a time-varying voltage signal 205 into a time-varying frequency signal 125. Time is indicated on axis 210 in microseconds (μs), voltage increases along axis 215, and frequency increases along axis 220. As FIG. 2 indicates, the time-varying voltage signal 205 includes a desired response period A and an arbitrary response period B. The instability during the arbitrary response period B in the time-varying voltage signal 205 is directly translated into the time-varying frequency signal 125, as shown.

Figure 3:
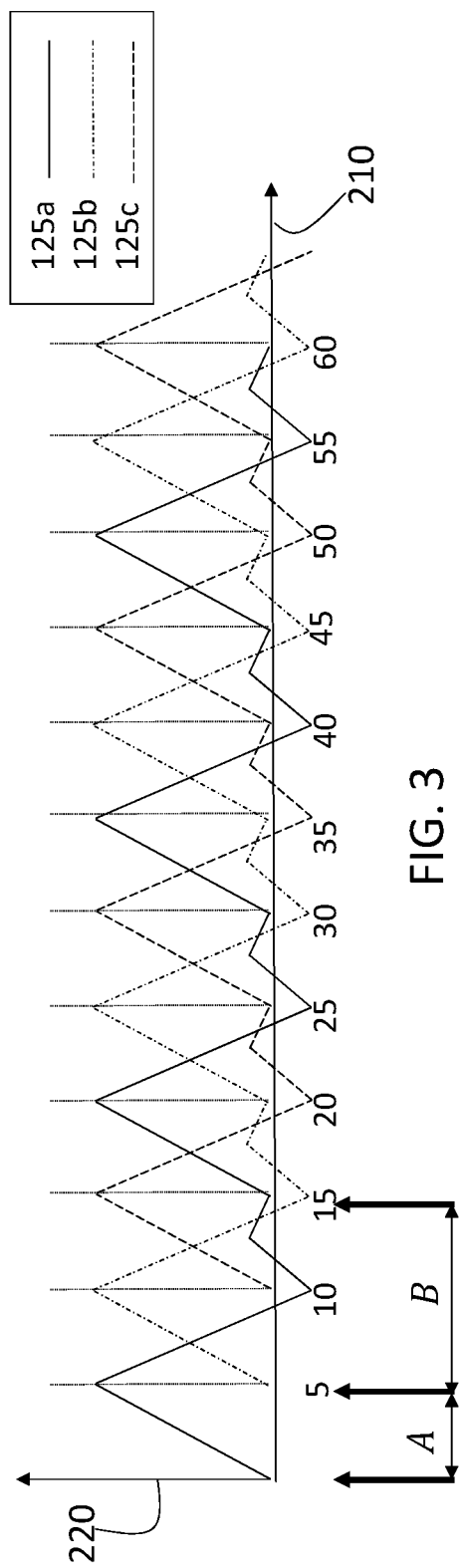
FIG. 3 shows exemplary voltage outputs of modulation elements according to an exemplary embodiment.

FIG. 3 shows exemplary frequency outputs 125a, 125b, 125c of each of the waveform generation devices 120a, 120b, 120c associated with each of the antennas 110a, 110b, 110c. The exemplary transmitted waveform is a linear frequency modulated signal. The desired modulation for one transmission by antenna 110a is indicated as A. The subsequent arbitrary response period or voltage relaxation period is indicated as B. As FIG. 3 indicates, the desired modulation period (A) when the antenna 110a is switched on can be shorter than the arbitrary response period (B) when the antenna 110a is switched off.

Figure 4:
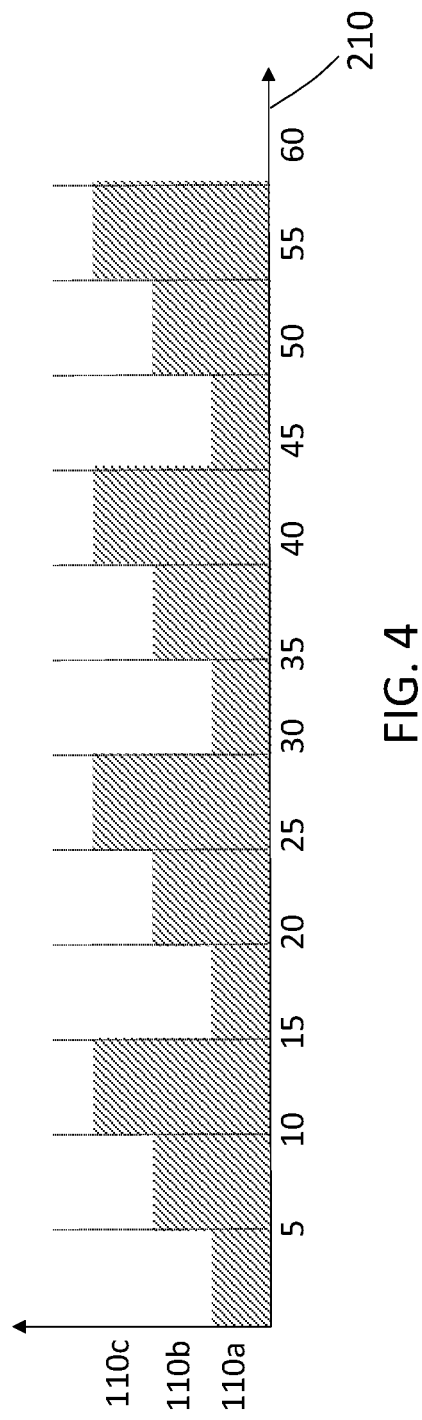
FIG. 4 provides an indication of which antenna is switched on for periods of time corresponding with those in FIG. 3.

FIG. 4 indicates which antenna 110 is switched on for the same time periods shown in FIG. 3. For example, for the desired modulation period indicated by A (i.e., 0 to 5 μs), the antenna 110a is switched on. For the arbitrary response period indicated by B, during which antenna 110a is switched off, antennas 110b and 110c are switched on in turn. That is, from 5 to 10 μs, antenna 110b is switched on, and from 10 to 15 μs, which is part of the arbitrary response period associated with modulation element 120b, antenna 110c is switched on. As soon as the arbitrary response period (B) is completed for modulation element 120a (at 15 μs), antenna 110a is switched on again.

As FIG. 4 indicates, each antenna 110 transmits for 5 μs and begins re-transmission every 15 μs. As FIG. 3 indicates, the voltage relaxation period associated with each antenna 110 is 10 μs. Together, FIGS. 3 and 4 show that each antenna 110 is switched on as soon as its associated voltage relaxation period is completed. More importantly, there is no period in which none of the antennas 110 is switched on. In alternate embodiments, the voltage relaxation period (e.g., B) may not align completely with the period during with other antennas 110 are transmitting. That is, even after antenna 110b and antenna 110c have transmitted, the voltage relaxation period associated with waveform generation device 120a, which corresponds with antenna 110a, may not be completed. As such, antenna 110a may not be switched on immediately after antenna 110c has transmitted, as shown in FIG. 4 for the exemplary case.

Even in this case, the period of non-transmission is minimized. This is because, if the antennas 110 shared the same waveform generation device 120 (with the same modulation element 201), then none of the antennas 110 could transmit during the entire voltage relaxation period (i.e., the arbitrary response period B of the modulation element 120) rather than a portion of the voltage relaxation period. In yet another embodiment, the voltage relaxation period may be shorter than the period in which other antennas 110 are transmitting. In this case, as in the case in which the voltage relaxation period is the same as the period in which other antennas 110 are transmitting, the voltage relaxation period does not extend the time between transmissions for a given antenna 110. Overall, based on each antenna 110 being associated with a separate modulation element 201, the reduction in transmission rate associated with the configuration in which the antennas 110 share a single modulation element 201 in a signal waveform generation device 120 is reduced or eliminated.

Figure 5:
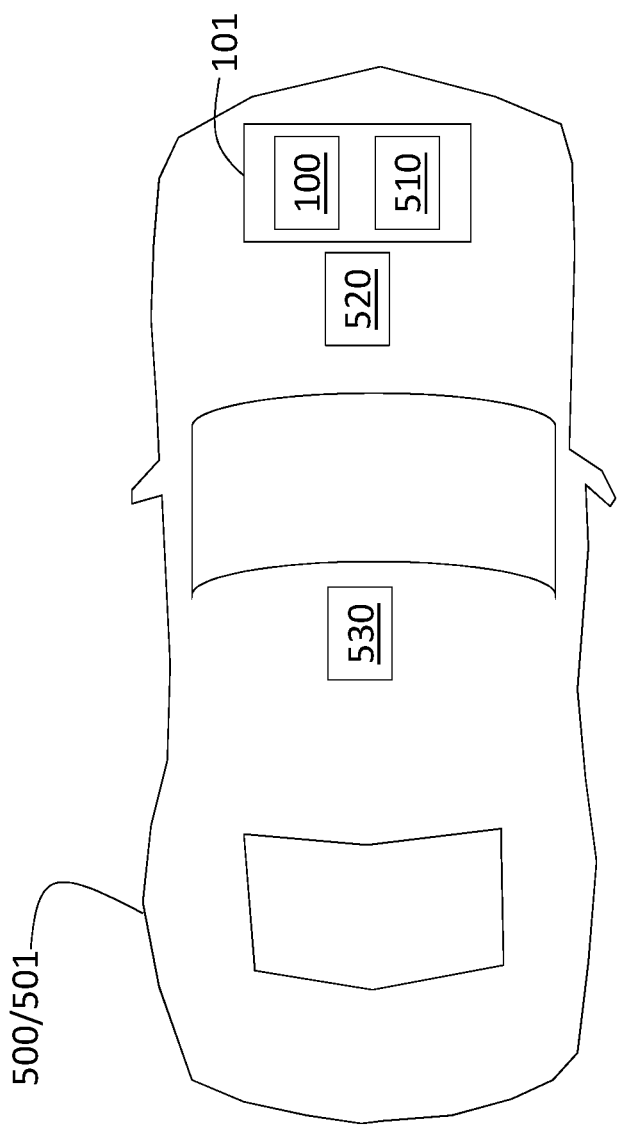
FIG. 5 is a block diagram of an exemplary platform that includes the transmit portion according to embodiments.

FIG. 5 is a block diagram of an exemplary platform 500 that includes the transmit portion 100 discussed with reference to FIGS. 1-4. The platform 500 shown in FIG. 5 is an automobile 501. In alternate embodiments, the platform 500 can be another type of vehicle or a stationary structure. The transmit portion 100 and a receive portion 510 of the radar system 101 are included in the automobile 501. The transmit portion 100 includes a separate modulation element 201 within a separate waveform generation device 120 corresponding with each antenna 110. As previously noted, separate antennas 110 can be used for the receive portion 510.

A controller 520 processes the received signals and can perform additional functions such as the collision avoidance by itself or in conjunction with other processors and controllers. The controller 520 provides the control signal over the control signal 140 to control the switches 105, for example, and may additionally supply the clock signal 130. The controller 520 includes known processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. Other sensors 530 may be coupled to the controller 520 to augment information provided by the radar system 101.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A radar system, comprising:

two or more antennas configured to transmit a respective transmit waveform; and two or more waveform generation devices including respective oscillators and modulation elements, wherein each of the two or more waveform generation devices has a one-to-one correspondence with one of the two or more antennas, and each of the two or more waveform generation devices generates the respective transmit waveform for a first period of time and generates an arbitrary response for a second period of time.

2. The system according to claim 1, further comprising two or more switches, wherein each of the two or more switches corresponds with one of the two or more antennas and turns the one of the two or more antennas on or off.

3. The system according to claim 2, wherein each of the two or more switches turns the respective one of the two or more antennas on during the first period of time and off during the second period of time.

4. The system according to claim 1, wherein only one of the two or more antennas transmits at a same time, and a duration for which others of the two or more antennas transmit is a third period of time.

5. The system according to claim 4, wherein the second period of time is less than the third period of time.

6. The system according to claim 4, wherein the second period of time is greater than the third period of time.

7. A method of configuring a radar system, the method comprising:

arranging two or more antennas to transmit a respective transmit waveform; and coupling two or more waveform generation devices, including respective oscillators and modulation elements, to the two or more antennas, wherein each of the two or more waveform generation devices has a one-to-one correspondence with one of the two or more antennas and each of the two or more waveform generation devices is configured to generate the respective transmit waveform for a first period of time and generate an arbitrary response for a second period of time.

8. The method according to claim 7, further comprising disposing two or more switches, wherein each of the two or more antennas is coupled respectively to each of the two or more waveform generation devices through a corresponding one of the two or more switches.

9. The method according to claim 8, further comprising providing a control line to the two or more switches, the control line configured to carry a control signal to control the two or more switches to turn the respective one of the two or more antennas on during the first period of time and off during the second period of time.

10. The method according to claim 7, further comprising providing a clock signal line to the two or more waveform generation devices.

* * * * *